United States Patent [19]
Albert

[11] Patent Number: 4,822,111
[45] Date of Patent: Apr. 18, 1989

[54] WHEEL ASSEMBLY AND METHOD OF FORMING SUCH ASSEMBLY

[75] Inventor: Barry R. Albert, Dillsburg, Pa.

[73] Assignee: Emhart Industries, Inc., Farmington, Conn.

[21] Appl. No.: 166,864

[22] Filed: Mar. 11, 1988

[51] Int. Cl.$^4$ .............................................. B60B 1/06
[52] U.S. Cl. ........................... 301/63 DD; 301/105 R
[58] Field of Search ......... 301/63 R, 63 DD, 63 PW, 301/80, 105 R, 105 S, 109

[56] References Cited

U.S. PATENT DOCUMENTS

| | | | |
|---|---|---|---|
| 1,851,880 | 3/1932 | Van Wormer | 301/63 DS X |
| 2,866,672 | 12/1958 | Black | 301/63 DD X |
| 4,193,639 | 3/1980 | Pauley et al. | 301/63 DS X |
| 4,351,569 | 9/1982 | Steuer et al. | 301/105 B X |
| 4,376,554 | 3/1983 | Schumacher | 301/63 DD |
| 4,518,372 | 5/1985 | Dye | 301/63 DD X |

FOREIGN PATENT DOCUMENTS 1142281 1/1963 Fed. Rep. of Germany ... 301/63 DS

Primary Examiner—Johnny D. Cherry
Assistant Examiner—Russell D. Stormer
Attorney, Agent, or Firm—Barry E. Deutsch

[57] ABSTRACT

A wheel assembly includes first and second wheel halves each having an outer annular rim with a valley portion and an integral wall with external and internal surfaces. Each wheel half is shaped at its center to form an opening extending through said wall, with the wall defining the opening including a flange like portion extending in a direction normal to the plane of the external surface of said integral wall. The wall defining opening functions as an annular bearing seat. A bearing includes a pair of spaced generally cylindrical flanges of a first diameter joined by a generally cylindrical intermediate portion of a diameter somewhat smaller than the first diameter. The cylindrical flanges of the bearing are supported by the walls defining each opening. First antirotation elements are affixed to the bearing and second antirotation elements are affixed to the first and second wheel halves to cooperate with the first antirotation elements for substantially preventing rotation of the bearing relative to the walls defining each opening. The first and second wheel halves are joined to form a complete wheel assembly.

2 Claims, 2 Drawing Sheets

WHEEL ASSEMBLY AND METHOD OF FORMING SUCH ASSEMBLY

BACKGROUND OF THE INVENTION

This invention relates to wheel assemblies and more particularly to a wheel assembly having an improved bearing.

Implements such as wheelbarrows and the like generally utilize two or more wheel assemblies to position the implement at a desired height above the underlying ground and to thence enable the implement to be moved along the ground. The implement wheels are subject to relatively high stresses, particularly in the general location of the wheel bearing. Failure of the bearing generally requires replacement of the wheel assembly.

Wheel assemblies of the type under discussion are generally formed from two wheel halves which are joined together by welding or by mechanical fasteners. Each wheel half generally includes its own bearing which is held in place by a bearing retainer or seat which is typically attached to the inside face of the wheel half by such means as brazing or welding. It is also known to employ a single bearing which extends between the two wheel halves. Generally such bearings have flanges which are riveted, or brazed or otherwise joined to the inside face of the wheel half.

During normal use, a wheel of the prior art design is subjected to a significant degree of stress which very often results in the welds, brazed joints, or rivets failing, which in turn results in the bearings having reduced operating life. When the bearings are no longer useful, the wheel assembly must be removed from the implement, the pneumatic tire removed from the wheel assembly, and the bearing replaced if possible. In many instances, the bearing cannot be replaced which then requires tool replacement of the wheel assembly.

As is readily recognized, the foregoing problems associated with bearing failure are both costly and relatively time consuming to repair and thus produce unnecessary expense to the user of the implement. Accordingly, it is an object of this invention to provide a wheel assembly having means for increasing the operating life of the wheel bearing, which means is relatively inexpensive to manufacture and incorporate in a wheel assembly.

SUMMARY OF THE INVENTION

The foregoing object and other objects of the invention are attained in a wheel assembly comprising first and second wheel halves each having an outer annular rim with a valley portion and having an integral wall with external and internal surfaces shaped at its center to form an opening extending through said wall, the wall defining said opening including a flange like portion extending in a direction normal to the plane of the external surface of said integral wall, said wall defining opening functioning as an annular bearing seat; bearing means having a pair of spaced generally cylindrical flanges of a first diameter joined by a generally cylindrical intermediate portion of a diameter somewhat smaller then the first diameter, said cylindrical flanges of said bearing means being supported by said wall defining opening; first antirotation means affixed to said bearing means and second antirotation means affixed to said first and second wheel halves in cooperative relationship with said first antirotation means for substantially preventing rotation of said bearing means relative to said wall defining opening; and means for joining said first and second wheel halves to form a complete wheel assembly.

The invention also relates to a method of forming a wheel assembly comprising the steps of forming a first wheel half with an opening at the diametrical center of a wheel wall; forming a second wheel half with an opening at the diametrical center of the wheel wall; forming a bearing member with two relatively large diameter spaced flange sections joined by a relatively small diameter cylindrical portion; forming first antirotation means integral with the wall of each of said first and second wheel halves; forming second antirotation means integral with the bearing member; and seating the bearing member in each wheel half whereby the flange sections of the bearing member are supported in the wheel openings and the first antirotation means are substantially in engagement with the second antirotation means.

DESCRIPTION OF THE PREFERRED EMBODIMENT

Figure 1:
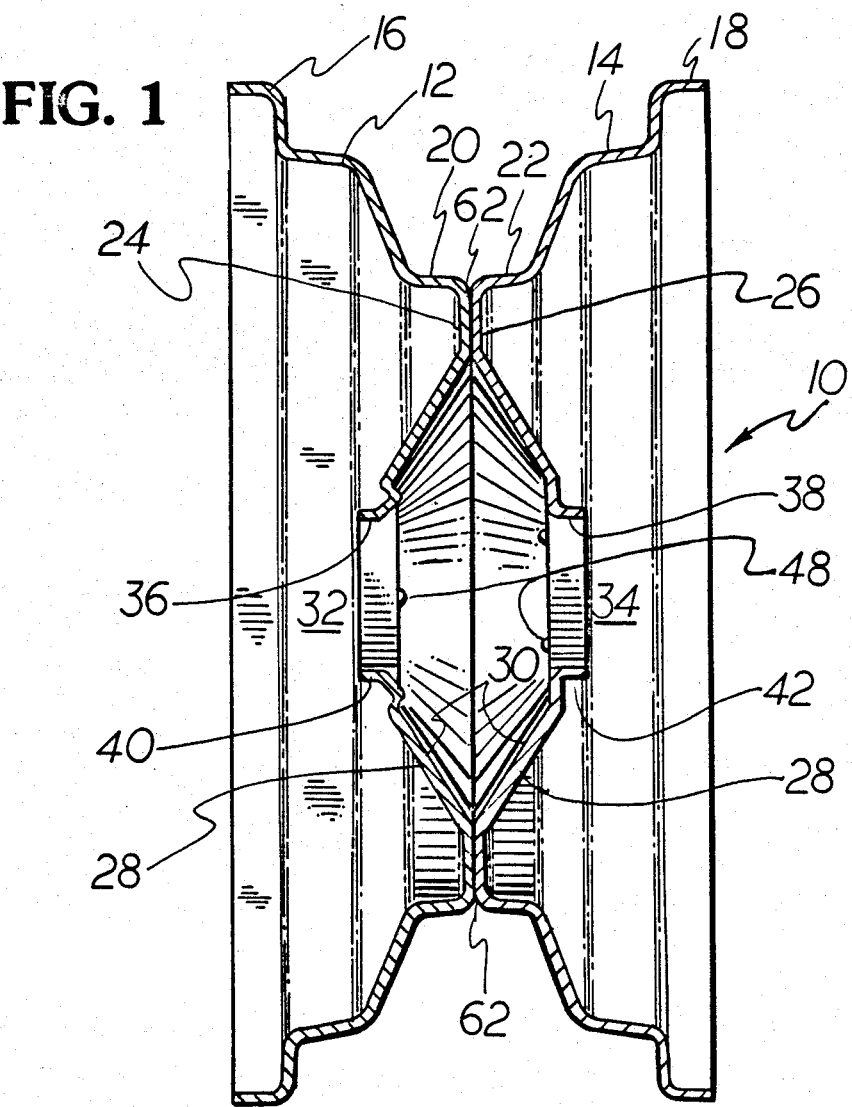
FIG. 1 illustrates an elevational view partially in section of a wheel assembly, with the wheel bearing thereof not shown.

Referring now to the drawing, there is disclosed a preferred embodiment of the present invention. In referring to the various figures of the drawing, like numerals shall refer to like parts.

Figure 5:
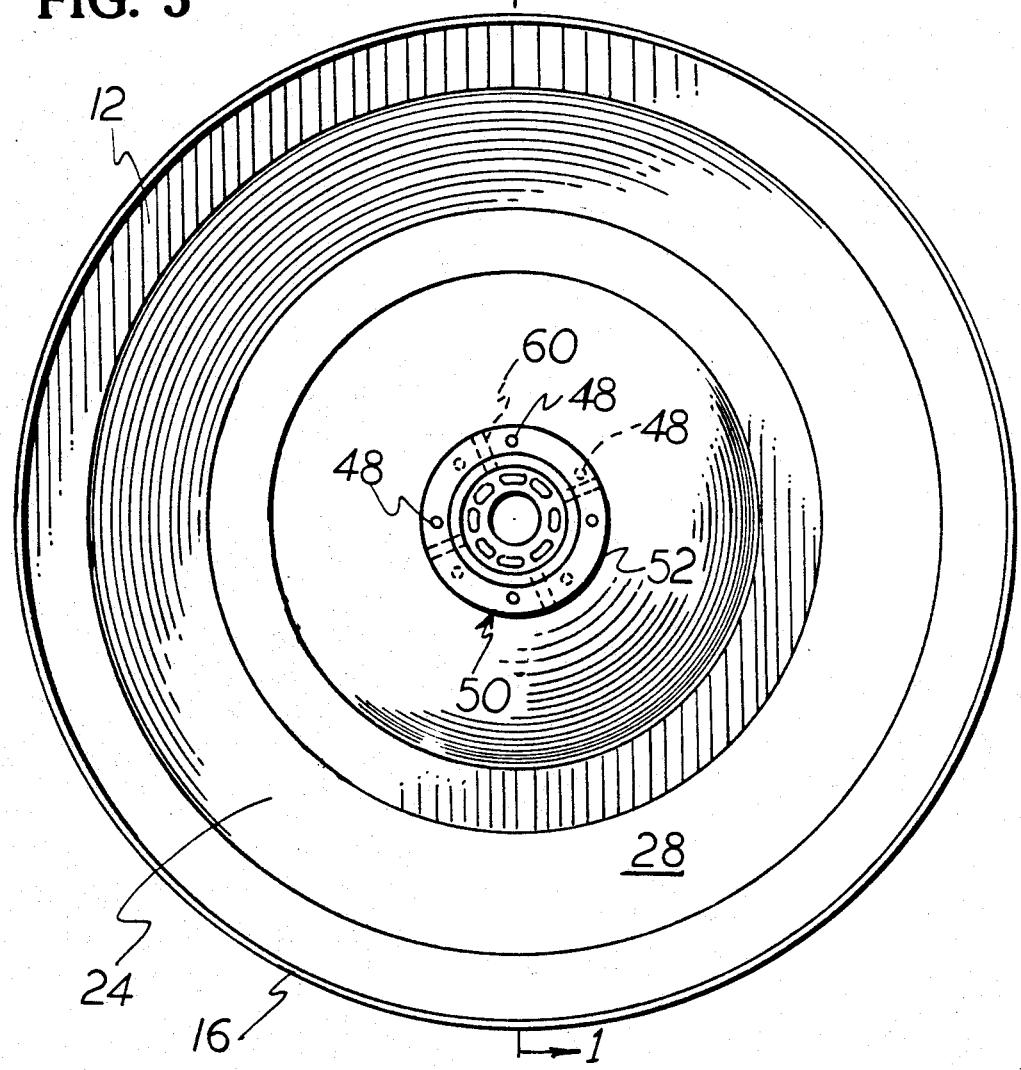
FIG. 5 is an end view of the wheel assembly illustrated in FIG. 1, with the wheel bearing inserted and shown.

Referring particularly to FIGS. 1 and 5, there is disclosed a wheel assembly 10 having a first wheel half 12 and a second wheel half 14. Each wheel half includes an outer annular rim portion 16, 18 and a valley portion 20, 22. Each wheel half 12, 14 includes an integral wall 24, 26 having an external surface 28 and internal surface 30.

Each integral wall 24, 26 is shaped at its general center to form openings 32, 34 respectively defined by annular walls 36, 38. Walls 36, 38 extend outwardly in a direction normal to the plane of the external surface 28 of each integral wall 24, 26 to form flange like portions 40, 42.

As illustrated particularly in FIG. 5, annular walls 36, 38 defining each opening 32, 34 function as a bearing seat for supporting bearing member 50 to be more fully described hereinafter. In the preferred embodiment external surface 28 of each integral wall 24, 26 is pressed inwardly at preselected locations to form a plurality of inwardly extending protrusions or dimples.

Figure 2:
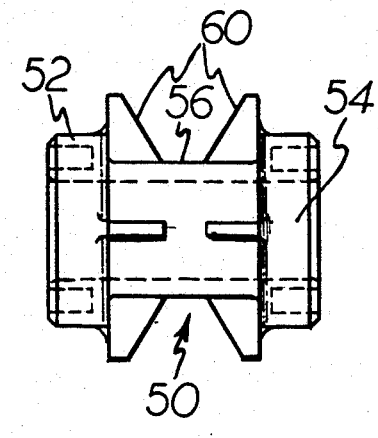
FIG. 2 is an elevational view of a bearing in accordance with the present invention.
Figure 3:
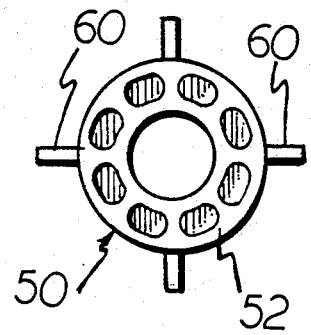
FIG. 3 is an end view of the bearing illustrated in FIG. 2.
Figure 4:
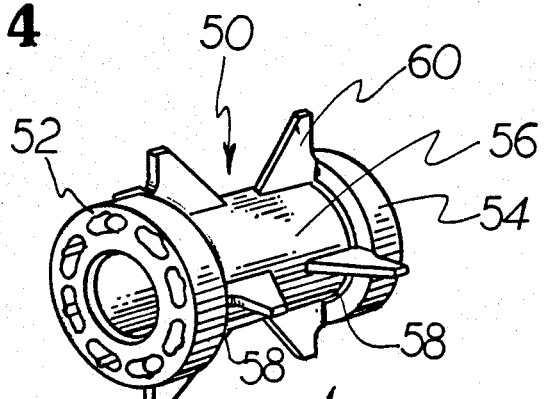
FIG. 4 is a perspective view of the bearing illustrated in FIG. 2.

Referring now particularly to FIGS. 2, 3 and 4, bearing member 50 shall be more completely described. Bearing member 50 is an injection molded part made from Nylatron GS nylon resin sold by the Polymer Corporation. The Nylatron GS resin is primarily a type 6/6 nylon having carefully controlled amounts of molybdenum disulphide added thereto. The molybdenum disulphide is a natural lubricant which when combined with the nylon provides a molding resin having excellenet thermal, mechanical and bearing properties.

Bearing member 50 includes a pair of spaced generally cylindrical flanges 52, 54 joined by a generally cylindrical intermediate portion 56. The diameter of flanges 52, 54 is somewhat larger then the diameter of the intermediate cylindrical portion 56. In the preferred embodiment a plurality of radially extending fingers 60 extend outwardly from the interface 58 of each cylindrical flange with the intermediate portion.

With reference to FIG. 5, it will be readily observed that dimples 48 formed on each wheel half extend inwardly from internal surface 30 to provide inwardly extending protrusions in the space defined by the internal surface 30 of each wheel half. It will also be observed that the dimples formed on first wheel half 12 are circumferentially displaced relative to the dimples formed on wheel half 14. The dimples form first antirotation means for the wheel assembly. When bearing member 50 is seated within openings 32, 34 dimples 48 cooperate with radially extending fingers 60, which function as second antirotation means, to prevent rotation of bearing member 50 relative to walls 24, 26 of wheel halves 12, 14. By circumferentially displacing dimples 48 formed on wheel half 12 with respect to dimples 48 formed on wheel half 14, the bearing member can be inserted without regard for the initial position of the dimples with respect to fingers 60. If, when the bearing member is inserted the dimples do not abut the fingers, the bearing member may rotate relative to the wheel halves; however with the number of dimples and fingers employed in the preferred embodiment the bearing member will only rotate 45° before one set of fingers will engage one set of dimples. For example fingers 60 adjacent flange 52 will engage dimples 48 extending inwardly from wall 24.

In manufacturing the wheel assembly, each wheel half is separately formed by suitable manufacturing processes such as stamping. After the wheel halves are formed but before they are attached, a bearing member 50 is inserted so that a flange portion 52, 54 of each bearing member 50 is supported within an opening 32, 34 of each wheel half by walls 36, 38 functioning as annular bearing seats. The bearing is inserted into each opening 32, 34 in a direction moving from the internal surface towards the external surface of integral walls 24, 26. An end of the bearing is press fit into each opening. After the bearing member is inserted, the two wheel halves are brought together and joined by suitable means such as welding 62 to form wheel assembly 10.

The wheel assembly manufactured as described herein is less costly to produce when compared to prior art assemblies since some components and/or joining steps (e.g. brazing or welding) have been eliminated. In addition, through the use of antirotation means on the bearing and wheel halves, the bearing is prevented from substantially rotating relative to the bearing seats.

While a preferred embodiment of the present invention has been described and illustrated the invention should not be limited thereto but may be otherwise embodied within the scope of the following claims.

I claim:

1. A wheel assembly comprising:

a first wheel half having an outer annular rim with a valley portion and having an integral wall with external and internal surfaces and shaped at its center to form an opening extending through said wall, the wall defining said opening including a flange like portion extending in a direction normal to the plane of the external surface of said integral wall and functioning as an annular bearing seat;

a second wheel half having an outer annular rim with a valley portion and having an integral wall with external and internal surfaces and shaped at its center to form an opening extending through said wall, the wall defining said opening including a flange like portion extending in a direction normal to the plane of the external surface of said integral wall and functioning as an annular bearing seat;

bearing means having a pair of spaced generally cylindrical flanges of a first diameter joined by a generally cylindrical intermediate portion of a diameter somewhat smaller than the first diameter, said cylindrical flanges of said bearing means being supported by said wall defining opening of each wheel; and first antirotation means affixed to said bearing means and second antirotation means affixed to said first and second wheel halves and cooperating with said first antirotation means for substantially preventing rotation of said bearing means relative to said walls defining said openings;

said second antirotation means includes a plurality of spaced dimples extending from the internal surface of each wheel half for engaging said first antirotation means, said dimples being disposed about the openings defined by said walls of said first and second wheel halves, with the position of the dimples about the opening defined by said wall of said first wheel half being circumferentially displaced relative to the position of the dimples about the opening defined by the said wall of said second wheel half; and means for joining said first and second wheel halves to form a complete wheel assembly.

2. A wheel assembly in accordance with claim 1 wherein said first antirotation means includes a plurality of radially extending fingers disposed at each interface of said bearing means intermediate portion with the bearing means cylindrical flanges.

* * * * *